United States Patent [19]
Oikawa

[11] Patent Number: 4,836,023
[45] Date of Patent: Jun. 6, 1989

[54] VIBRATIONAL ANGULAR RATE SENSOR
[75] Inventor: Takahiro Oikawa, Susono, Japan
[73] Assignee: Yazaki Corporation, Japan
[21] Appl. No.: 165,797
[22] Filed: Mar. 9, 1988
[51] Int. Cl.$^4$ ............................................. G01P 9/04
[52] U.S. Cl. ...................................... 73/505; 310/351
[58] Field of Search ............ 73/505, DIG. 1, DIG. 4; 310/321, 351, 367

[56] References Cited

U.S. PATENT DOCUMENTS 4,511,821 4/1985 Nakamura et al. ................. 310/351

FOREIGN PATENT DOCUMENTS 61-114123 5/1986 Japan ..................................... 73/505

OTHER PUBLICATIONS

"Vibrating Angular Rate Sensor May Threaten the Gyroscope," William D. Gates, *Electronics*, Jun. 10, 1968, pp. 130–134.
"Solid State Angular Rate Sensor (VYRO)," L. D. Sunderland and E. F. Arthur, AIAA Control Conf., 1980, pp. 183–187.

*Primary Examiner*—John Chapman
*Attorney, Agent, or Firm*—Wigman & Cohen

[57] ABSTRACT

To increase the quality factor Q of the vibrational angular rate sensor and therefore the sensitivity of the sensor, stabilize the sensor performance, facilitate wiring work, and minimize the sensor, a square pillar shaped vibrator, four vibrator node support pins and an external vibrator support base are all formed integral with each other from a single constant elasticity material block. Further, at least three and preferably four piezoelectric elements are connected to an external circuit via at least three and preferably four separate thin film conductive layers each extending from each piezoelectric element, on and along each vibrator node support pin, to an external vibrator support base.

4 Claims, 6 Drawing Sheets

VIBRATIONAL ANGULAR RATE SENSOR

BACKGROUND OF THE INVENTION

1. Field of the Invention

The present invention relates to a vibrational angular rate sensor, and more specifically to an angular rate sensor of small vibration energy loss or of high quality factor Q, where quality factor Q is $2\pi \times$ (energy stored in a vibrational system/energy dissipated per peroid).

2. Description of the Prior Art

Vibrational angular rate sensors are disclosed, for instance in Japanese Unexamined Published (Kokai) Utility Model Applications No. 60-35212 (referred to first prior art sensor), No. 60-41815 (referred to second prior-art sensor, No. 59-25414 (referred to third prior-art sensor), etc. In these prior-art vibrational sensors, a vibrator is supported at vibration nodes by vibrator node-supporting members formed different from the vibrator itself. For instance, in the first prior art sensor, the vibrator node-supporting members are composed of elastic tubes fitted to holes formed in the vibrator and support pins inserted into the elastic tubes. In the second prior-art sensor, the vibrator node-supporting members are made of rigid members and fixed to the vibrator at vibration nodes by bonding, soldering, mechanical caulking, etc. In the third prior-art sensor, an external cell member directly fixed to an object to be measured and a vibrator support base are manufactured separately, and the cell member is made of a relatively soft material to absorb external forces applied thereto.

In these prior-art vibrational sensors, however, there exist various problems in that vibration energy loss is inevitably produced between the vibrator and the node supporting members and therefore the quality factor Q therefore is not high. As a result, the sensor sensitivity is low. In addition, since holes or grooves must be formed precisely in the vibrator and the vibrator node-supporting member to accurately support the vibrator relative to the vibrator external supporting member, the machining and assembling processes are complicated and not easy, and further the vibrator reliability is inadequate. Furthermore, it has been difficult to miniaturize the vibrational sensor from the manufacturing standpoint.

On the other hand, in the vibrational angular rate sensors, two pair of piezoelectric elements are attached to four side surfaces of the square pillar shaped vibrator to drive the vibrator and to detect an angular rate (velocity) applied to the vibrator. Each of these four piezoelectric elements is covered with an thin film electrode and connected to an external circuit through a fine wire.

In more detail, with reference to Prior Art FIGS. 1A, 1B and 1C, the vibrator 1 is formed into a square pillar shape having four side surfaces. A pair of driving piezoelectric elements 2A and 2B and a pair of sensing piezoelectric elements 3A and 3B are attached to each side surface of the vibrator 1, separately, as shown. Further, a pair of thin film driving element electrodes 4A and 4B are formed on the driving piezoelectric elements 2A and 2B by vacuum deposition, sputtering, etc., and a pair of thin film detecting element electrodes 5A and 5B are formed on the detecting piezoelectric elements 3A and 3B by the same thin film forming techniques.

Further, four fine node-support pins 6 are attached to the vibrator 1 at its node positions to support the vibrator 1 relative to an external vibrator support base member 7. Further, the driving element electrodes 4A and 4B and the detecting element electrodes 5A and 5B are connected to an external circuit through four fine conductive wires 4AC, 4BC, 5AC and 5BC.

In the above-mentioned prior-art vibrational sensor, although the four fine conductive wires 4AC, 4BC, 5AC and 5BC are arranged near the vibration nodes, it is very difficult to accurately arrange the conductive wires at the node positions. Additionally, since the conductive wires 4AC, 4BC, 5AC, and 5BC have a mass and also are movable, respectively, there exists a problem in that the vibration nodes are dislocated, so that the quality factor Q of the vibrator is lowered. Further, the connection work of the fine conductive wires 4AC, 4BC, 5AC and 5BC is complicated and therefore not easy. Furthermore, it is difficult to minimize the shape of the vibrator because the fine conductive wires must be fixed onto the vibrator.

SUMMARY OF THE INVENTION

With these problems in mind, therefore, it is the primary object of the present invention to provide a vibrational angular rate sensor high in quality factor, easy to manufacture and assemble, high in reliability, and easy to minimize the vibrator connection lead mass.

To achieve the above-mentioned objects, the vibrational angular rate sensor according to the present invention comprises: (a) vibrator means; (b) means for node-supporting said vibrator means at at least one vibration node of said vibrator means; (c) means for externally supporting said vibrator means via said vibrator node-supporting means; and (d) said vibrator means, said vibrator node-supporting means, and said external vibrator supporting means all being formed integral with each other from a single material block.

The vibrator is formed into a square pillar shape and supported by the four vibrator node support pin members at two different node points. Further, the sensor comprises at least three and preferably four piezoelectric elements attached to four side surfaces of the square pillar shaped vibrator; and four thin film electrodes each extending from one of the at least three and preferably four piezoelectric elements, on and along one of the four vibrator node support pin members, to the external vibrator support base member so as to be connectable to a fine conductive wire.

BRIEF DESCRIPTION OF THE DRAWINGS

The features and advantages of the vibrational angular rate sensor according to the present invention will be more clearly appreciated from the following description taken in conjunction with the accompanying drawings in which like reference numerals designates the same or similar elements or sections throughout the figures thereof and in which.

DETAILED DESCRIPTION OF THE PREFERRED EMBODIMENTS

Figure 2A:
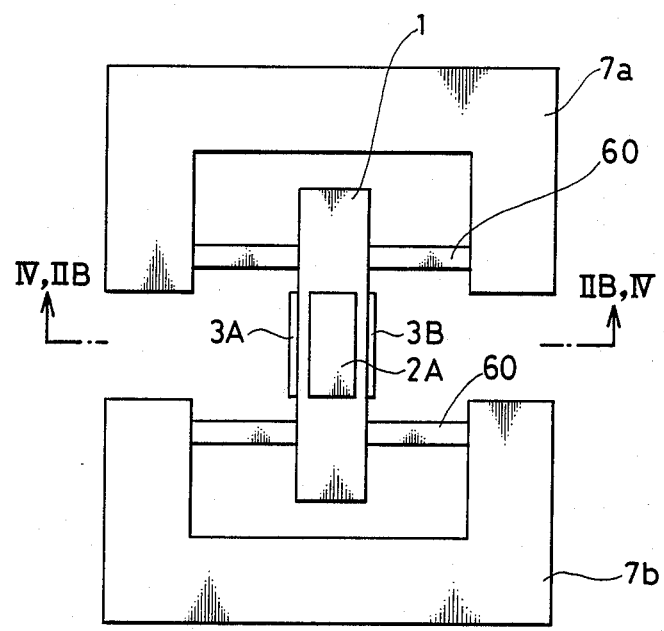
FIG. 2A is a top view showing a first embodiment of the vibrational angular rate sensor according to the present invention.
Figure 2B:
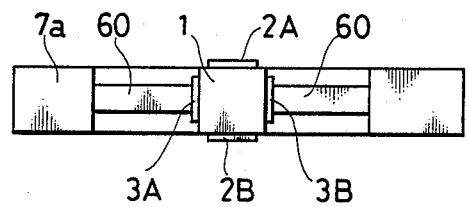
FIG. 2B is a cross-sectional view of the vibrational sensor, taken along the line IIB—IIB shown in FIGS. 2A.

FIGS. 2A and 2B shows a first embodiment of the vibrational angular rate sensor according to the present invention. A vibrator 1 is supported by two separate square U-shaped external vibrator supporting bases 7a and 7b via two vibrator node supporting pins 60.

The feature of this sensor is to form all the above three members 1, 7a, 7b, and 60 from the same material block integral with each other. The sensor material is a constant elasticity material such as Ni-Span-C a trademark of The International Nickel Co., for nickel-chromium-titanium-carbon alloy product, etc., and the manufacturing method is an etching process, an machining process, etc. Instead of the constant elasticity material, it is of course possible to use another metallic material, ceramics, crystalline materials etc. Further, an etching technique manufacturing method is preferable from the standpoints of productivity, precision, and miniaturization of the vibration sensor.

The vibrator node supporting pins 60 are formed at two vibration nodes on the side surfaces of the square pillar shaped vibrator 1 and supported within the square U-shaped spaces of the two external vibrator supporting bases 7a and 7b. The cross section of the vibrator 1 is square in shape as shown in FIG. 2B, and the thickness of the vibrator 1 is substantially the same as that of the external vibrator supporting bases 7a and 7b.

On at least three and preferably four side surfaces of the vibrator 1, four piezoelectric elements such as PZT (lead zirconate titanate) of zircon-and-lead titanic acid based ceramic are bonded to the vibrator 1 with a bonding agent, by soldering, by sputtering, etc. That is, a driving piezoelectric element 2A is bonded on the upper side surface of the vibrator 1 (in FIG. 2B); a feedback piezoelectric element 2B is bonded on the lower side surface thereof; a detecting piezoelectric element 3A is bonded on the left side surface thereof; and a braking piezoelectric element 3B is bonded on the right side surface thereof.

When an electric field is applied between the driving piezoelectric element 2A and the feedback piezoelectric element 2b, the vibrator 3 is excited into free vibration. During vibration, although the vibrator node supporting pins 60 are twisted, since the vibrator support bases 7a and 7b, the vibrator 1 and the vibrator node support pins 60 are formed integral with each other, it is possible to minimize vibration energy loss transmitted from the vibrator 1 to the external vibrator supporting bases 7a and 7b via the vibrator node supporting pins 60.

Figure 3:
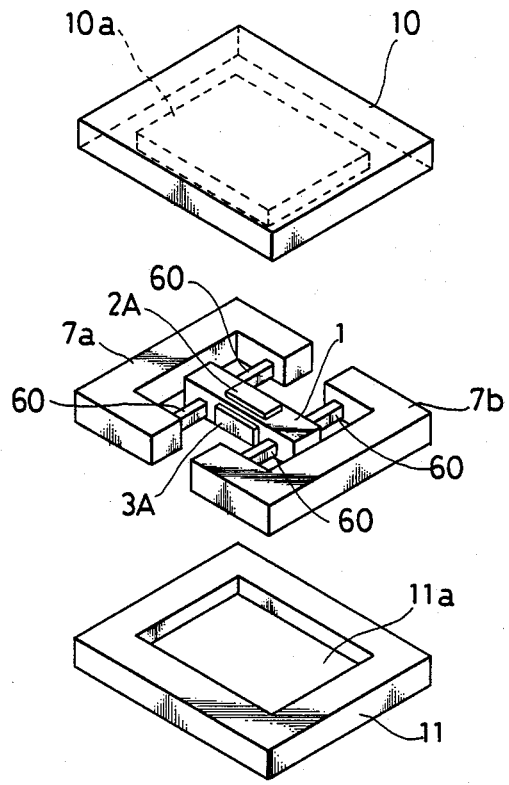
FIG. 3 is an exploded view showing the vibrational sensor according to the present invention sandwiched between two sensor lids.

The vibrational sensor constructed as described above is sandwiched between two upper and lower sensor lids 10 and 11 each formed with a square recess 10a or 11b, respectively, inside the lid as depicted in FIG. 3.

Figure 4:
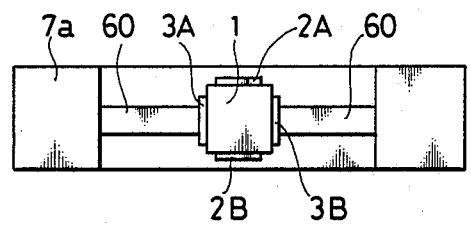
FIG. 4 is a cross-sectional view showing a second embodiment of the vibrational angular rate sensor according to the present invention, taken along the line IV—IV shown in FIG. 2A.

FIG. 4 shows a second embodiment of the vibrational angular rate sensor of the present invention. In this second embodiment, the thickness of the vibrator 1 is formed thinner than that of the external vibrator supporting bases 7a and 7b. Since the vibrator 1 is always vibrated within the space of the vibrator supporting bases 7a and 7b, it is unnecessary to form each internal square recess 10a or 11a in the sensor lid 10 or 11. Further, the vibration sensor of this second embodiment can directly be attached to a printed circuit board, for instance or can be incorporated with another sensor (e.g. semiconductor pressure sensor) within a single chip together with a sensor signal processing circuit.

As described above, in the vibrational sensor of the present invention, since the vibrator, the vibrator node supporting pins and the external vibrator supporting bases are all formed integral with each other from a single material block, it is possible to minimize the vibration energy loss and to maximize the vibrator quality factor Q, so that a high sensitivity vibration angular rate sensor can be realized.

Figure 1A:
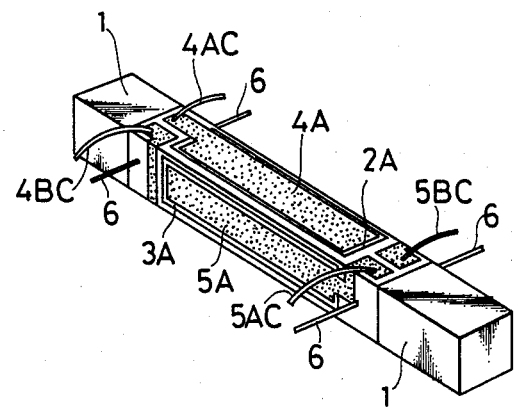
FIG. 1A is a perspective view showing a prior-art vibrational sensor formed with piezoelectric elements, thin film element electrodes, and fine conductive wires.
Figure 1B:
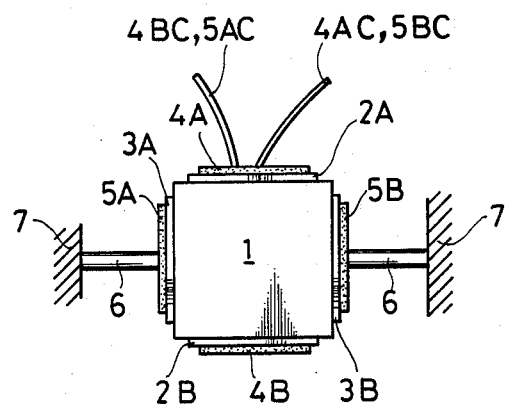
FIG. 1B is a cross-sectional view of the prior-art vibrational sensor shown in FIG. 1A.
Figure 1C:
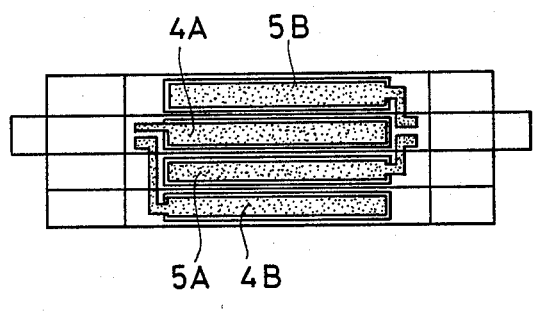
FIG. 1C is an expanded view of the side surfaces of the prior-art vibrational sensor shown in FIG. 1A.
Figure 5A:
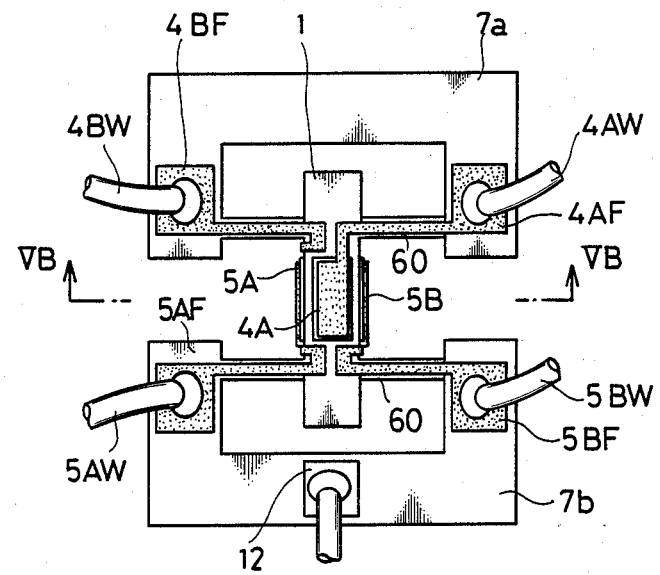
FIG. 5A is a top view showing a third embodiment of the present invention.
Figure 5B:
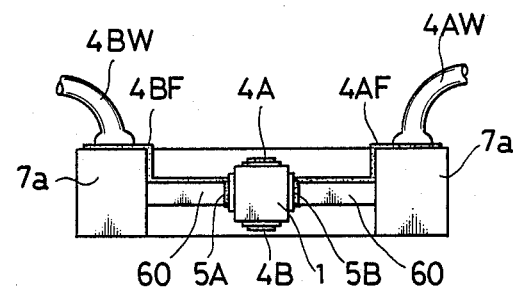
FIG. 5B is a cross-sectional view, taken along the line VB—VB in FIG. 5A.

To further increase the vibrator quality factor Q, in the vibrational angular rate sensor of the present invention, the four fine conductive wires 4AC, 4BC, 5AC and 5BC (shown in FIG. 1A) are replaced with four thin film conductive layers 4AF, 4BF, 5AF and 5BF as shown in FIGS. 5A and 5B.

In more detail, the driving element electrode 4A on the driving element 2A is formed integral with the thin film conductive layer 4AF. This thin film conductive layer 4AF is bent at the node point and extends along the node supporting pin 60 to an end of the external vibrator supporting base 7a. This thin film conductive layer 4AF is broadened in area at the end of the vibrator supporting base 7a to which an external fine conductive wire 4AW is connected. Further, although not shown, the thin film electrode 4A is directly connected to the piezoelectric driving element 2A but the thin film conductive layer 4AF (integral with the thin film electrode 4A) is insulated from the vibrator 1, the vibrator node supporting pin 60 and the external vibrator supporting base 7a via an insulating layer (not shown). The other element electrodes 4B, 5A and 5B and the other thin film conduction layers e.g., 4BF, 5AF and 5BF are formed substantially in the same manner as in the driving element electrode 4A and the thin film conductive layers 4AF. Further, in FIG. 5(A), the numeral 12 denotes a grounded electrode.

In the vibrational sensor shown in FIG. 5(A), since no fine conductor wires are connected to the vibrator and the piezoelectric elements are connected to an external circuit via four thin film conductive layers, it is possible to further decrease vibration energy loss and therefore increase the quality factor Q of the vibrator of the vibration sensor. In addition, it is possible to stabilize the location of node points on the vibrator and the quality factor Q thereof.

Further, since the thin film conductive layers can be formed by vacuum deposition, sputtering techniques, etc., it is possible to further improve the manufacturing precision of the vibration sensor and make uniform the quality of the vibration sensor.

Figure 6A:
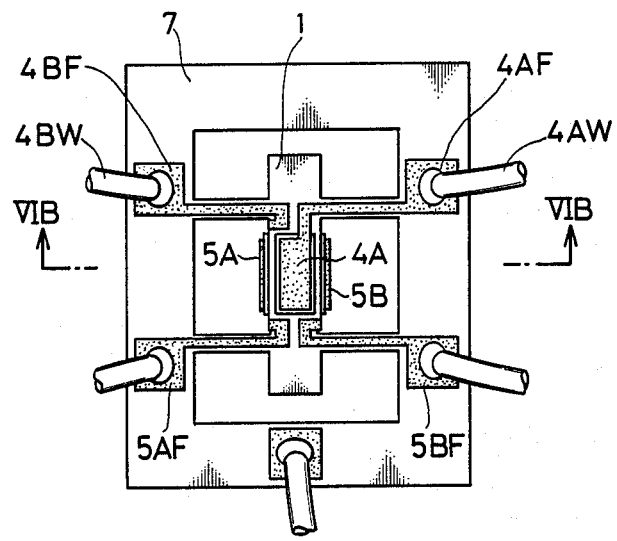
FIG. 6A is a top view showing a first modification of the third embodiment of the present invention.
Figure 6B:
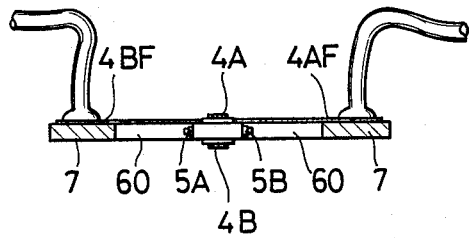
FIG. 6B is a cross-sectional view, taken along the line VIB—VIB in FIG. 6A.

FIGS. 6(A) and 6(B) show a first modification of the vibration sensor according to the present invention. In this modification, the thickness of the vibrator is formed substantially the same as that of the external vibrator supporting vase 7. Further, the external vibrator supporting base 7 is formed into square O-shaped increase the strength of a thin vibrator supporting base. In this modification, since the thin film conductive layers 4AF, 4BF, 5AF, and 5BF can be formed on the same surface level without bending, it is possible to facilitate the film forming process (e.g. vacuum deposition process).

Figure 7:
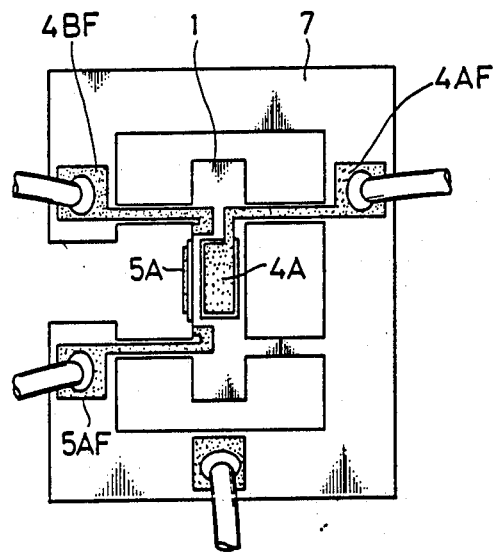
FIG. 7 is a top view showing a second modification of the third embodiment of the present invention.

FIG. 7 shows a second modification of the vibrational sensor according to the present invention. In this modification, the external vibrator supporting base 7 is formed into a square C shape. Where only a single piezoelectric element 3A and a single element electrode 5A are required to be attached to one side surface of the vibrator 1, this construction is convenient, because the piezoelectric element 3A and the electrode 5A can be formed by vacuum deposition, for instance, through the open side of the support base 7.

Figure 8:
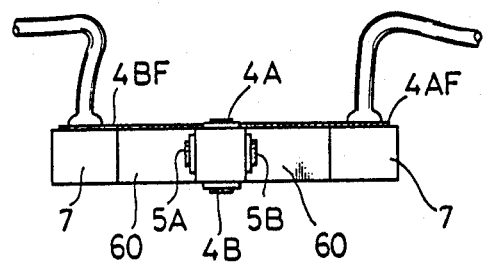
FIG. 8 is a cross-sectional view of another modification of the third embodiment of the present invention.

FIG. 8 shows another modification of the vibrational sensor. In this modification, the vibrator 1 is formed into square-shaped cross section, and the thickness of the vibrator 1 is substantially the same as that of the external vibrator supporting base 7. In this modification, the vibrator supporting base 7 can be formed into a square C shape as shown in FIG. 7 or into a square O shape as shown in FIG. 6(A).

As described above, in the vibrational angular rate sensor according to the present invention, since the thin film conductive layers are formed, along the vibrator node support pins to the vibrator supporting base so as to be directly connectable to fine external conductive wires, it is possible to manufacture stable vibration angular rate sensor having stabilized vibration node points. Further, since the fine conductive wires are connected to the vibrator only on the external vibrator supporting base side (out of the vibration system), the wiring work is facilitated.

What is claimed is:

1. A vibrational angular rate sensor, comprising:
   (a) a vibrator of square pillar shape;
   (b) means for node-supporting said vibrator at two vibration nodes of said vibrator;
   (c) means for external support of said vibrator via said vibrator node-supporting means;
   (d) said vibrator, said vibrator node-supporting means, and said vibrator external support means all being formed integral with each other from a single material block;
   (e) at least three piezoelectric elements attached to at least three side surfaces of said square pillar shaped vibrator; and
   (f) at least three thin film conductive layers each extending along one of said vibrator node-supporting means from one of said at least three piezoelectric elements to said external vibrator supporting means so as to be connectable to an external fine conductive wire.

2. The vibrational angular rate sensor as set forth in claim 1, wherein said external vibrator supporting means is formed into two separate square U shapes.

3. The vibrational angular rate sensor at set forth in claim 1, wherein said external vibrator supporting means is formed into a single Square O shape.

4. The vibrational angular rate sensor as set forth in claim 1, wherein said external vibrator supporting means is formed into a single square C shape.

* * * * *